(12) United States Patent
Kmetich et al.

(10) Patent No.: US 10,258,950 B2
(45) Date of Patent: Apr. 16, 2019

(54) METHOD OF MAKING A PACKAGED FUEL UNIT FOR A HYDROGEN GENERATOR

(71) Applicant: Intelligent Energy Inc., San Jose, CA (US)

(72) Inventors: Thomas J. Kmetich, Willoughby Hills, OH (US); Chad E. Law, Milan, OH (US); Richard A. Langan, Parma, OH (US)

(73) Assignee: INTELLIGENT ENERGY INC., San Jose, CA (US)

( * ) Notice: Subject to any disclaimer, the term of this patent is extended or adjusted under 35 U.S.C. 154(b) by 979 days.

(21) Appl. No.: 14/563,492

(22) Filed: Dec. 8, 2014

(65) Prior Publication Data

US 2015/0089796 A1    Apr. 2, 2015

Related U.S. Application Data

(63) Continuation of application No. PCT/US2013/044906, filed on Jun. 10, 2013.
(Continued)

(51) Int. Cl.
  *B01J 8/00*      (2006.01)
  *C01B 3/00*      (2006.01)
  *H01M 8/04082*   (2016.01)

(52) U.S. Cl.
  CPC .............. *B01J 8/008* (2013.01); *C01B 3/0005* (2013.01); *H01M 8/04208* (2013.01);
  (Continued)

(58) Field of Classification Search
  CPC .. B01J 8/008; C01B 3/0005; Y10T 29/49083; Y10T 29/49366; Y02P 70/56;
  (Continued)

(56) References Cited

U.S. PATENT DOCUMENTS 6,544,400 B2    4/2003   Hockaday et al.
6,838,209 B2    1/2005   Langan et al.
(Continued)

FOREIGN PATENT DOCUMENTS

CN    201154897 Y    11/2008
CN    201323221 Y    10/2009
(Continued)

OTHER PUBLICATIONS

International Search Report for corresponding International Application No. PCT/US2013/05104; dated Dec. 20, 2013; 8 pages.
(Continued)

*Primary Examiner* — Peter DungBa Vo
*Assistant Examiner* — Azm Parvez
(74) *Attorney, Agent, or Firm* — BakerHostetler

(57) ABSTRACT

A method of making a package for a fuel unit, a fuel unit including the package, and a hydrogen generator including one or more of the fuel units are disclosed. The package includes a package strip made by forming apertures in a nonconductive substrate strip, forming conductor sections in a conductor strip, aligning the substrate and conductor strips, bonding the conductor sections to the substrate strip to cover the apertures, and removing non-bonded portions of the conductor strip. A package enclosing a hydrogen generating reactant is formed by securing a segment of the package strip to itself, to one or more other segments and/or to one or more other package components. One or more conductor sections in the package strip are in thermal contact with one or more quantities of reactant composition so heat can be transferred thermally decompose the reactant composition and generate hydrogen gas.

18 Claims, 5 Drawing Sheets

Related U.S. Application Data

(60) Provisional application No. 61/657,909, filed on Jun. 11, 2012.

(52) U.S. Cl.
CPC ............ *Y02E 60/324* (2013.01); *Y02E 60/364* (2013.01); *Y02P 70/56* (2015.11); *Y10T 29/49083* (2015.01); *Y10T 29/49366* (2015.01)

(58) Field of Classification Search
CPC .............. H01M 8/04208; Y02E 60/324; Y02E 60/364; H05K 3/02; H05K 3/20; H05K 3/4641; H05K 3/0064; H05K 3/0067; H05K 3/022; H05K 3/025
USPC ...................................... 29/611, 610.1, 592.1
See application file for complete search history.

(56) References Cited

U.S. PATENT DOCUMENTS

| | | |
|---|---|---|
| 6,955,863 B2 | 10/2005 | Bean et al. |
| 7,820,312 B2 | 10/2010 | Eickhoff |
| 9,056,768 B2 | 6/2015 | Langan |
| 2001/0045364 A1 | 11/2001 | Hockaday et al. |
| 2002/0088178 A1 | 7/2002 | Davis |
| 2004/0126643 A1 | 7/2004 | Kinkelaar et al. |
| 2007/0298306 A1 | 12/2007 | Finkelshtain et al. |
| 2008/0032167 A1 | 2/2008 | Matsouka et al. |
| 2008/0274384 A1 | 11/2008 | Finkelshtain et al. |
| 2009/0136796 A1 | 5/2009 | Finkelshtain et al. |
| 2009/0244848 A1* | 10/2009 | Lim .................... H01L 23/4334 361/709 |
| 2009/0304558 A1 | 12/2009 | Patton et al. |
| 2010/0104481 A1 | 4/2010 | Curello et al. |
| 2011/0052929 A1* | 3/2011 | Nairn .................. B29C 47/0021 428/516 |
| 2011/0176973 A1 | 7/2011 | Rosenzweig et al. |
| 2011/0177404 A1 | 7/2011 | Hung et al. |
| 2011/0177405 A1 | 7/2011 | Hung et al. |
| 2011/0207027 A1 | 8/2011 | Kim et al. |
| 2012/0002420 A1* | 1/2012 | Imai ..................... H01L 33/486 362/249.02 |
| 2012/0156103 A1 | 6/2012 | Lin et al. |
| 2013/0087371 A1* | 4/2013 | Meyer-Berg ...... H01L 23/49816 174/257 |
| 2014/0044605 A1 | 2/2014 | Langan et al. |

FOREIGN PATENT DOCUMENTS

| | | |
|---|---|---|
| CN | 101632197 A | 1/2010 |
| EP | 1367025 A1 | 12/2003 |
| EP | 1437918 | 7/2004 |
| JP | 2008-254967 A | 10/2008 |
| JP | 2011-140420 A | 7/2011 |
| WO | 2007044452 | 4/2007 |
| WO | 2009116593 | 7/2009 |
| WO | WO 2009/086541 A1 | 7/2009 |
| WO | WO 2013/188260 A2 | 12/2013 |

OTHER PUBLICATIONS

International Search Report dated Dec. 20, 2013, issued in International patent application PCT/US2013/044906.

* cited by examiner

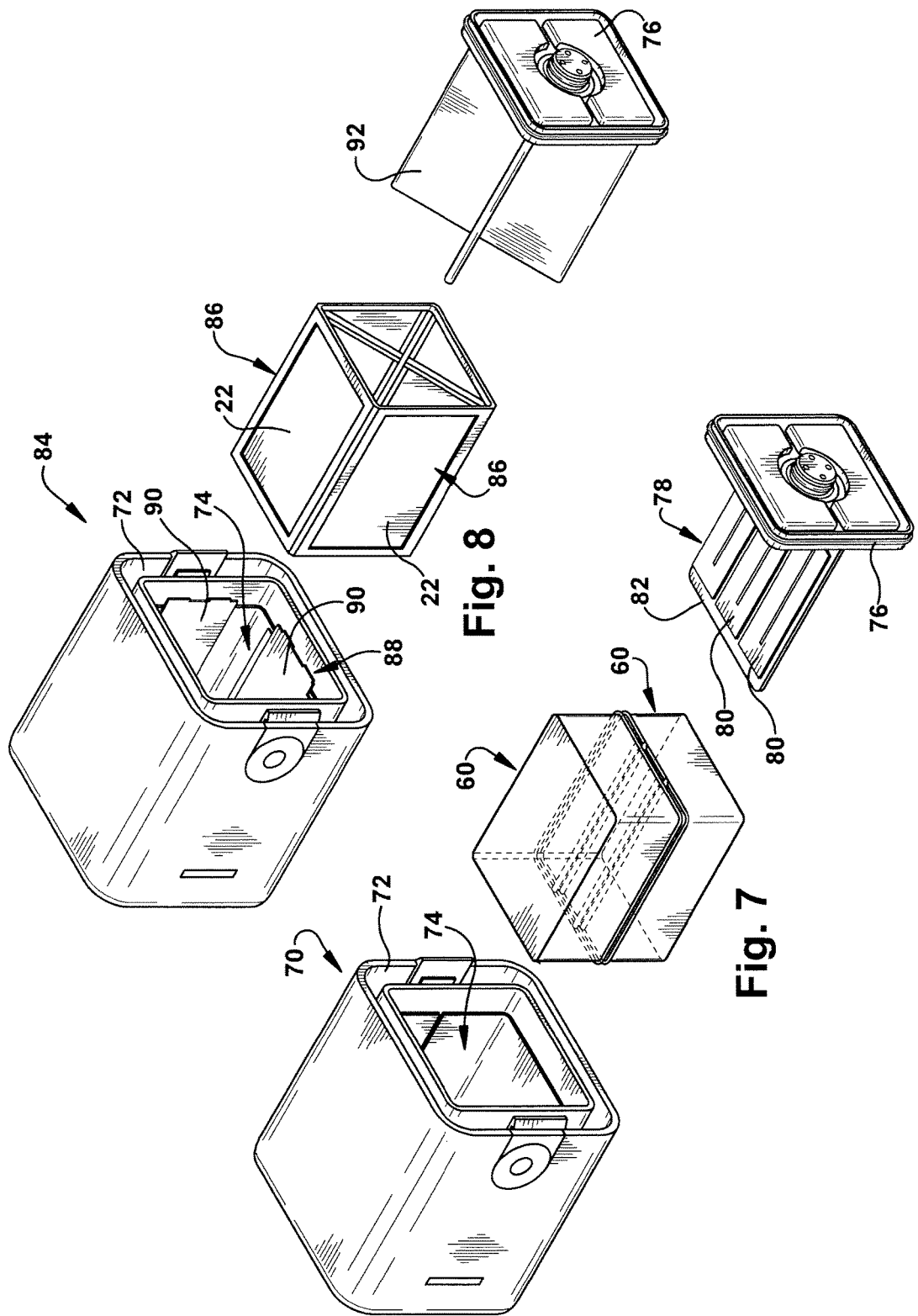

METHOD OF MAKING A PACKAGED FUEL UNIT FOR A HYDROGEN GENERATOR

This patent application is a Continuation of international patent application PCT/US2013/044906 filed Jun. 10, 2013, which claims priority to Provisional patent application 61/657,909 filed Jun. 11, 2012, the disclosures of which are incorporated by reference in their entirety.

TECHNICAL FIELD

This invention relates to a hydrogen generator for providing hydrogen gas, particularly a method of making a package for a fuel unit containing a reactant for the hydrogen generator and a method of making a packaged fuel unit including the package.

BACKGROUND

Interest in fuel cell batteries as power sources for portable electronic devices has grown. A fuel cell is an electrochemical cell that uses materials from outside the cell as the active materials for the positive and negative electrode. Because a fuel cell does not have to contain all of the active materials used to generate electricity, the fuel cell can be made with a small volume relative to the amount of electrical energy produced compared to other types of batteries.

Fuel cells can be categorized according to the type of electrolyte used, typically one of five types: proton exchange membrane fuel cell (PEMFC), alkaline fuel cell (AFC), phosphoric-acid fuel cell (PAFC), solid oxide fuel cell (SOFC) and molten carbonate fuel cell (MCFC). Each of these types of fuel cell can use hydrogen and oxygen as the active materials of the fuel cell negative electrode (anode) and positive electrode (cathode), respectively. Hydrogen is oxidized at the negative electrode, and oxygen is reduced at the positive electrode. Ions pass through an electrically nonconductive, ion permeable separator and electrons pass through an external circuit to provide an electric current.

In some types of hydrogen fuel cells, hydrogen is formed from a hydrogen-containing fuel supplied to the negative electrode side of the fuel cell. In other types of hydrogen fuel cells, hydrogen gas is supplied to the fuel cell from a source outside the fuel cell.

A fuel cell system can include a fuel cell battery, including one or more fuel cells (e.g., a fuel cell stack), and a fuel source, such as a fuel tank or a hydrogen generator. Hydrogen generators that supply hydrogen gas to a fuel cell can be an integral part of a fuel cell system, or they can be removably coupled to the fuel cell system. A removable hydrogen generator can be replaced with another one when the hydrogen producing reactants have been consumed. Removable hydrogen generators can be disposable (intended for only a one-time use). Both removable and permanently installed hydrogen generators can be refillable (intended for use multiple times) to replace consumed reactant materials.

Hydrogen generators can produce hydrogen using a variety of reactants and a variety of methods for initiating the hydrogen generating reactants. Hydrogen gas can be evolved when a hydrogen containing material reacts. Examples of hydrogen containing materials include liquid or gaseous hydrocarbons (such as methanol), hydrides (such as metal hydrides and chemical hydrides), alkali metal silicides, metal/silica gels, water, alcohols, dilute acids and organic fuels (such as N-ethylcarbazone and perhydrofluorene). A hydrogen containing compound can react with another reactant to produce hydrogen gas, when the reactants are mixed together, in the presence of a catalyst, heat or an acid, or a combination thereof. A hydrogen containing compound can be heated to evolve hydrogen in a thermochemical decomposition reaction.

In selecting reactants for use in a hydrogen generator, consideration may be given to the following: (a) stability during long periods of time when the hydrogen generator is not in use, (b) ease of initiation of a hydrogen generating reaction, (c) the amount of energy that must be provided to sustain the hydrogen generating reaction, (d) the maximum operating temperature of the hydrogen generating reaction, and (e) the total volume of hydrogen that can be produced per unit of volume and per unit of mass of the reactant(s).

Reactants that can undergo thermal decomposition reactions to produce hydrogen gas are desirable because they generally produce a relatively high volume of hydrogen gas on a volumetric basis. Resistive electric heating elements can be used to provide the necessary heat to initiate the hydrogen producing reaction. Reactants can be contained in replaceable fuel units, which can be enclosed in packages. Therefore, to initiate the reaction, heat from external heating elements or electricity to operate internal heating elements must be conducted into the package. One way to accomplish this is through electrically and/or thermally conductive areas on the package. It may be desirable to heat only a limited portion of the reactant in a fuel unit at one time. This can be facilitated by having a separate electrically and/or thermally conductive area in the package associated with each of several portions of the reactant.

An object of the present invention is to provide a method for making a package for a hydrogen generator fuel unit that has one or more electrically conductive and/or thermally conductive areas in the package. It is desirable for the package to have a simple design, be made of a limited number of inexpensive materials and components and be manufactured easily and economically. A further object of the invention is to provide a method of making a fuel unit including the package and a hydrogen generator including the fuel unit.

SUMMARY

In one aspect of the invention, there is provided a method of making a package for a hydrogen generator fuel unit, the method including the steps: providing a substrate strip made of an electrically nonconductive material with a thermal conductivity less than 10 watts/meter·Kelvin; forming an array of apertures in the substrate strip; providing a conductor strip made of an electrically conductive material with a thermal conductivity greater than 10 watts/meter·Kelvin; forming an array of conductor sections in the conductor strip; aligning individual conductor sections in the conductor strip with apertures in the substrate strip; bonding a peripheral portion of each of the individual conductor sections to a portion of the substrate strip surrounding one or more of the apertures to form a bonded strip; and removing non-bonded portions of the conductor strip from around the bonded conductor sections of the bonded strip to form a package strip. Embodiments can include one or more of the following features:

the substrate strip is made from a material with a thermal conductivity less than 5 watts/meter·Kelvin, preferably less than 2 watts/meter·Kelvin, and more preferably less than 1 watt/meter·Kelvin;

the conductor strip is made from a material with a thermal conductivity greater than 100 watts/meter·Kelvin;

the substrate strip and the conductor strip are made from materials that are stable at temperatures up to at least 250° C.;

the substrate strip is made from at least one high temperature polymer; the at least one high temperature polymer can be a combination or composite of two or more high temperature polymers; the at least one high temperature polymer can be a polymer selected from polyetheretherketone, polyimides, phenolics, and derivatives thereof;

the conductor strip is made from a material selected from metals, metal alloys and nonmetallic materials; the metal can be one of aluminum, steel, copper and nickel, combinations and alloys thereof; the non-metallic material can be a graphite based material;

the substrate strip is provided in a roll;

the conductor strip is provided in a roll;

the package strip is wound into the form of a roll;

the package strip is cut into segments for a subsequent batch process;

the array of apertures includes apertures arranged in a longitudinal row extending parallel to a longitudinal axis of the substrate strip; the array of apertures can include more than one longitudinal row extending parallel to a longitudinal axis of the substrate strip; the apertures in one longitudinal row can be aligned with the apertures in another longitudinal row to form transverse rows of apertures perpendicular to a longitudinal axis of the substrate strip; the apertures in one longitudinal row can be aligned with the apertures in another longitudinal row to form diagonal rows of apertures that are neither parallel nor perpendicular to a longitudinal axis of the substrate strip;

the substrate strip and the conductor strip have registration features for aligning the individual conductor sections in the conductor strip with the corresponding apertures in the substrate strip;

the conductor sections are be bonded to the substrate with a continuous bond around the peripheral portion of the conductor sections;

the conductor sections are be bonded to the substrate with a discontinuous bond around the peripheral portion of the conductor sections;

the bonding is performed by a method selected from thermal bonding, adhesive bonding, ultrasonic welding and laser welding;

the step of forming an array of conductor sections in the conductor strip includes creating weak areas around the conductor sections to facilitate removing nonbonded portions of the conductor strip from around the bonded conductor sections of the bonded strip; the weak areas can include one or more of narrow bands connecting the conductor sections to surrounding conductor strip, and coined areas between the conductor sections and surrounding conductor strip;

the step of forming an array of conductor sections in the conductor strip includes removing some portions of the conductor strip around the conductor sections and leaving a non-bonded web of conductor strip material connected to the conductor sections; the non-bonded web of conductor strip material can be removed by breaking the web near the conductor sections to disconnect the web from the conductor sections, and separating the disconnected web from the remainder of the bonded strip;

the step of removing nonbonded portions of the conductor strip from around the bonded conductor sections of the bonded strip is performed while a bonding tool is in contact with the conductor strip;

more than one aperture is covered by a single conductive section; after bonding a peripheral portion of each of the individual conductor sections to a portion of the substrate strip surrounding each of the corresponding apertures, a portion of the conductor material between adjacent apertures covered by the single conductive section can be removed so each of the aperatures that was covered by a single conductive section is covered by a separate conductive section;

the substrate strip and the conductor strip are aligned with their longitudinal axes parallel to each other; and the substrate strip and the conductor strip are aligned with their longitudinal axes perpendicular to each other during bonding.

In another aspect of the invention, there is provided a method of making a fuel unit for a hydrogen generator, the method including the steps: providing a segment of package strip made by the method described above; and enclosing a reactant composition within a package including the package strip segment; the package strip segment having one or more conductor sections therein, each conductor section arranged so current or heat can be conducted therethrough to a portion of the reactant composition; and the reactant composition including a reactant that can thermally decompose to produce hydrogen gas when heated to at least a minimum reaction temperature. Embodiments can include one or more of the following features:

the fuel unit has one or more heating elements contained within the package, and current can be conducted through each of the one or more conductor sections to a corresponding heating element to produce heat for heating a portion of the reactant composition;

one or more heating elements outside the fuel unit can be disposed such that heat from each of the one or more heating elements can be conducted through the corresponding conductor sections to heat a portion of the reactant composition;

the package includes more than one package strip segments;

a peripheral portion of the package strip segment is secured to enclose the reactant composition in the package; the package strip segment can be secured to itself, to another package strip segment, to another package component, or a combination thereof; the package strip segment can be secured by heat sealing, adhesive bonding, ultrasonic welding, laser welding or pressure lamination; the peripheral portion of the package strip segment is secured by a continuous or a discontinuous bond;

the package includes a pouch formed by securing peripheral portions of one or more package strip segments together;

the package includes another package component to which the package strip segment is secured; the other package component can include one or more compartments, each containing reactant composition; each compartment can contain a portion of the reactant composition and be secured to the package strip segment such that current or heat can be conducted through a conductor section to provide energy to heat the portion of the reactant composition contained therein; the other package component includes a high temperature polymer;

the fuel unit includes a hydrogen gas outlet; the outlet can be a valve or an opening in the package;

the reactant composition in the fuel unit is segregated into portions; each portion can be heated by one or more heating elements; a single heating element can heat more than one portion; the portions can include thermal insulation therebetween;

In another aspect of the invention, there is provided a method of making a hydrogen generator, the method including the steps: providing one or more fuel units made by the method described above; providing a housing with one or more cavities for removably containing one or more of the fuel units; providing one or more heating elements, each heating element configured to heat a portion of a reactant composition in the one or more fuel units to at least a minimum reaction temperature; providing an energy source and electric circuitry for supplying electric current to the one or more heating elements; combining the housing, the heating elements, the energy source and the electric circuitry in a configuration that can produce hydrogen gas when the one or more fuel units are removably inserted into the one or more cavities. Embodiments can include one or more of the following features:

the housing is sealable to contain hydrogen gas produced by the one or more fuel units;

the housing includes a hydrogen gas outlet for controlling release of the hydrogen gas to a hydrogen consuming device;

each of the heating elements is contained within the housing and makes thermal contact with a conductor section in the fuel unit package when a fuel unit is contained within the hydrogen generator;

each of the heating elements is contained within the one or more fuel units, and electrical contact terminals in the hydrogen generator make electrical contact with conductor sections in the fuel unit package to provide current to the heating element;

the energy source is disposed within the housing;

the energy source is disposed outside the housing and provides current to the hydrogen generator via electrical leads extending through the housing;

Unless otherwise specified herein, all disclosed characteristics and ranges are as determined at room temperature (20-25° C.).

BRIEF DESCRIPTION OF THE DRAWINGS

In the drawings:

FIG. 7 is a perspective view of an embodiment of a hydrogen generator and fuel units for insertion therein; and FIG. 8 is a perspective view of an embodiment of a hydrogen generator and fuel units for insertion therein.

DETAILED DESCRIPTION

Figure 1:
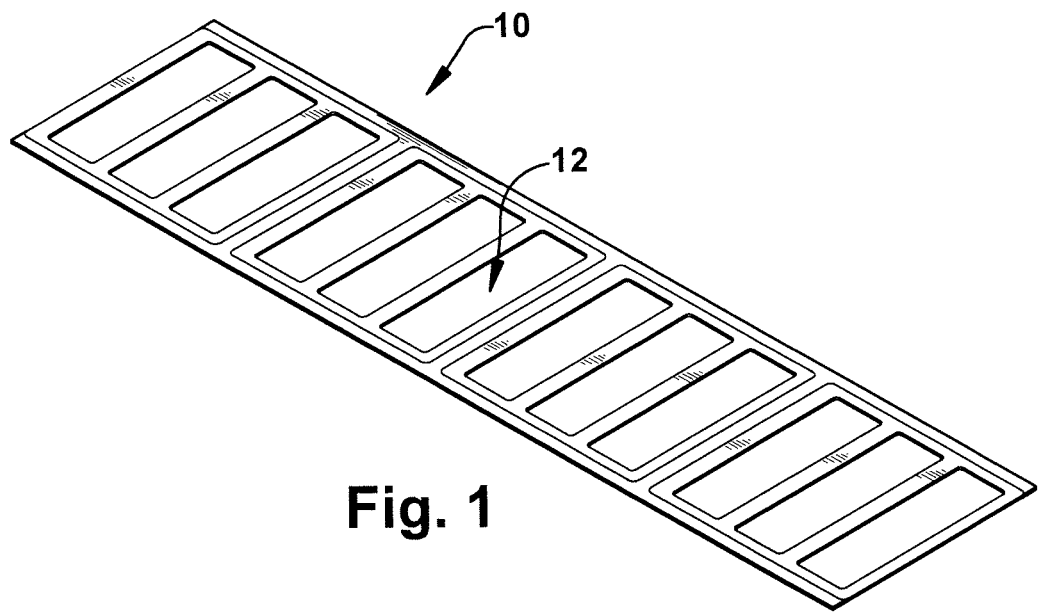
FIG. 1 is a perspective view of a portion of a substrate strip after forming apertures therein.

The above objects are accomplished by the present invention, which includes a package for a fuel unit, the package including a segment of a package strip made according to the following description. The packaged fuel unit can be removably inserted into a hydrogen generator that can be used to provide hydrogen gas device such as a fuel cell battery or a hydrogen consuming device or appliance. The fuel unit contains reactant composition enclosed within the package. The reactant composition includes one or more reactants that can thermally decompose to produce hydrogen gas when heated to at least a minimum reaction temperature at which the reactant(s) will react. The package includes a segment of a package strip made from a substrate with one or more apertures, each covered with a conductor section. The substrate is made from a material that is a poor electrical and thermal conductor, and the conductor section is made from a good electrical and thermal conductor. The conductor section provides a conductive area in the package through which electric current or heat can be conducted. Internal or external heating elements are used to heat the reactant composition. Current is conducted through conductor sections to an internal heating element (within the fuel unit). Heat from an external heating element (outside the fuel unit) is conducted through a conductor section. In both embodiments, heat is provided to heat the reactant composition.

The fuel unit package includes at least one package strip segment. Peripheral portions of one or more package strip segments can be sealed together to form a pouch for enclosing the reactant composition. Alternatively, one or more package strip segments can be secured to another package component of the package. The package can include package strip segments from the same package strip or different package strips, made of the same or different materials, made by the same or different processes, or having the same or different structures.

A package strip is made from a substrate strip and a conductor strip. One or both of these strips can be in relatively short segments, which may be suitable for feeding from a magazine for example. One or both of the strips can be in the form of a roll from which the strip can be fed in a high speed, high volume manufacturing process. The substrate strip is made of an electrically nonconductive material having a thermal conductivity less than 10 watts/meter·Kelvin (preferably less than 5 watts/meter·Kelvin, more preferably less than 2 watts/meter·Kelvin, and most preferably less than 1 watts/meter·Kelvin). As used herein, an electrically nonconductive material has an electrical resistivity more than $1 \times 10^{16}$ ohm·m at 20° C. The substrate strip material is stable at the expected operating temperature of the hydrogen generator (e.g., up to at least 250° C.). For example, the substrate strip can be made from a flexible glass or at least one high temperature polymer (i.e., one or a combination or composite of two or more high temperature polymers). As used herein, "high temperature polymer" means having a heat distortion temperature (deflection temperature under load) (per ASTM D648 at 18.56 kg/cm² (264 psi)) greater than the maximum temperature which the package strip is designed to withstand (preferably a heat distortion temperature of at least 250° C.). An example of a flexible glass is Corning Willow Glass from Corning, Inc. The high temperature polymer(s) can be a polymer selected from polyetheretherketone, polyimides, phenolics, and derivatives thereof In some embodiments a flexible substrate may be desired (e.g., to allow feeding of the substrate strip from a roll), and in others a more rigid material may be desired (e.g., to provide greater strength or to facilitate feeding of shorter lengths of substrate strip in sections, such as from a stack or a magazine). Polyetheretherketone (PEEK) is a preferred high temperature polymer. Various types and grades of PEEK are commercially available. For example, Victrex Manufacturing Limited provides PEEK films ranging in thickness from about 6 !An to about 750 !mu and widths of up to 1450 mm. VICTREX® APTIV™ PEEK™ 1100 series grades are mineral filled (reinforced), and VICTREX® APTIV™ PEEK™ 1000 series grades are not reinforced. In an embodiment, the nominal thickness is about 0.100 mm or greater to about 0.150 mm or less.

The conductor strip is made of an electrically conductive material having a thermal conductivity greater than 10 watts/meter·Kelvin (preferably greater than 100 watts/meter·Kelvin). As used herein, an electrically conductive material has an electrical resistivity less than $1\times10^{-5}$ ohm·m at 20° C. The conductor strip is stable at the expected operating temperature of the hydrogen generator. It can be made from a material selected from metals, metal alloys and non-metallic materials. In some embodiments a flexible conductor strip may be desired (e.g., to allow feeding of the conductor strip from a roll), and in others a more rigid conductor strip may be desired (e.g., to provide greater strength or to facilitate feeding of shorter lengths of conductor strip in sections, such as from a stack or a magazine). In an embodiment, the nominal conductor strip thickness is about 0.025 mm or greater to about 0.050 mm or less. A suitable metal can be one of aluminum, steel, stainless steel, copper and nickel, a combination or an alloy thereof, for example. The non-metallic material can be a graphite based material (e.g., GRAFOIL®, made by GrafTech).

An array of apertures is formed in the substrate strip. The array can include any number of apertures in any pattern that is desired. A regular pattern may be advantageous to facilitate alignment (registration) of the apertures with corresponding conductive sections in the conductor strip, as described below. For example, the apertures can be arranged in a single or multiple longitudinal rows, extending parallel to a longitudinal axis of the substrate strip. Apertures in one longitudinal row can be aligned with apertures in one or more other longitudinal rows to form rows such as transverse rows perpendicular to a longitudinal axis of the substrate strip or diagonal rows that are neither parallel to nor perpendicular to a longitudinal axis of the substrate strip. The apertures can be formed by a suitable method, such as die cutting (e.g., with a punch and die set, a clinking die, a rotary die or a steel-rule die), drilling (e.g., with a fluted or hole saw bit), laser cutting, or chemical or mechanical removal (e.g., by etching or other type of ablation). The array of apertures can be formed before or after combining the substrate strip with a conductor strip.

An array of conductor sections is formed in the conductor strip. The array can include any number of conductor sections in any pattern that is desired. A regular pattern may be advantageous to facilitate registration or alignment of the conductor sections with corresponding apertures in the substrate strip, as described below. For example, the conductor sections can be arranged in a single or multiple longitudinal rows, extending parallel to a longitudinal axis of the conductor strip. Conductor sections in one longitudinal row can be aligned with conductor sections in one or more other longitudinal rows to form rows such as transverse rows perpendicular to a longitudinal axis of the substrate strip or diagonal rows that are neither parallel to nor perpendicular to a longitudinal axis of the substrate strip. The conductor sections can be formed by a suitable method, such as die cutting (e.g., with a punch and die set, a clinking die, a rotary die or a steel-rule die), drilling (e.g., with a fluted or hole saw bit), waterjet or photoetching, or laser cutting.

When the conductor sections are formed, they remain connected to at least a portion of the remainder of the conductor strip. The conductor sections can be formed by making cuts in the conductor strip at edges of the conductor sections. Some portions of the conductor strip may be removed before bonding the conductor sections to the substrate strip if desired, leaving a web of conductor strip material to which the conductor sections are connected. During or after conductor section forming, weak areas that are easily broken can be created between the conductor sections and the surrounding conductor strip material. These weak areas can be narrow necks near the points of connection, or they can be areas of reduced material thickness (e.g., made by coining) for example. These weak areas facilitate subsequent removal of conductor strip web from the conductor sections, as described below.

The substrate strip and the conductor strip are aligned such that conductor sections in the conductor strip are aligned with apertures in the substrate strip. For example, the substrate strip and the conductor strip can be aligned with a longitudinal axis of one strip parallel to a longitudinal axis of the other strip, and with the array of apertures aligned with the array of conductor sections such that each of the conductor sections is adjacent to one or more than one corresponding aperture that it will cover. This can be facilitated by the patterns of both the aperture and conductor section arrays being regular and/or the same. With the longitudinal axes of the substrate and conductor strips parallel, one or both strips can be continuously fed from a roll. However, it is not necessary for the longitudinal axes of the substrate and conductor strips to be parallel. For example the longitudinal axes can be at an angle, such as 90 degrees. This may require indexing of each of the strips in order to properly align the conductor sections with corresponding apertures. The substrate strip and the conductor strip can have registration features for aligning individual conductor sections with corresponding apertures. The registration features can include a series of holes or notches along the length of the strip for example. The apertures and/or edges of the conductive sections or webbing can be used as registration features if desired.

It may be desirable to treat or prepare the surface of either or both of the substrate strip and the conductor strip to promote good adhesion. This can include surface roughening (e.g., grit blasting or another form of abrasion of a metal surface), degreasing, treating (e.g., corona, plasma and flame), cleaning and the like. This can be done either before or after forming the arrays of apertures and conductor sections.

With the conductor sections aligned with corresponding apertures, peripheral portions of the conductor sections are bonded to portions of the substrate strip surrounding the corresponding apertures so each of the apertures is covered by a corresponding conductor section, thereby forming a bonded strip. One or a plurality of apertures can be covered by a single conductor section. As used herein, the term covered means the conductor section extends completely across the entire aperture, regardless of which surface of the substrate strip to which the conductor strip is bonded. The bonds can be continuous or discontinuous bonds around the peripheral portions of the conductor sections. A continuous bond can provide a seal around the aperture; a discontinuous bond can provide a path for gas to escape through the package. The conductor sections can be bonded using a suitable method, such as thermal bonding (direct or inductive), adhesive bonding, ultrasonic welding or laser welding. Any bonding materials (e.g., hot melt or adhesive materials)

should be chosen to be stable at the expected operating temperature of the hydrogen generator (e.g., to avoid producing gases that could contaminate the hydrogen gas). Silicon based adhesives may be suitable. Heat and/or pressure can be applied; the temperature, pressure and can vary depending on the properties of the materials, their thicknesses and so on. A bonding tool such as a press platen can be used, e.g., to apply heat and/or pressure. The bonding tool can be covered with a release layer to prevent the materials being bonded from sticking to the tool, or an interleaf layer can be added before bonding for the same purpose and then removed later in the process.

After the bonded strip is formed, an array of apertures can be formed in the substrate (e.g., by chemical or mechanical removal) if not formed before forming the bonded strip, and nonbonded portions of the conductor strip (i.e., the conductor strip web), are removed from around the bonded conductor sections of the bonded strip to form a package strip. This can be done by breaking the web at the weak areas near the conductor sections (e.g., by pulling the web away from the bonded strip as it is being rolled onto a takeup reel) to disconnect the web from the remainder of the bonded strip. The web can be removed as part of the bonding step (e.g., while the conductor sections are being held against the substrate strip by a bonding tool) or after the bonding step.

If a plurality of apertures is covered by a single conductor section, a portion of the conductor section between adjacent apertures can be later removed so that each of the adjacent apertures is covered by a single, smaller conductor section. Portions of the conductor section can be removed mechanically, with a grinding or cutting wheel, with a laser or by etching for example. In some situations this may facilitate manufacturing, reduce scrap or improve efficiency, by reducing assembly time and/or reducing the required alignment accuracy prior to the bonding step for example.

The package strip can be further processed in making the package. For example, if the package strip includes more than one longitudinal row of apertures covered by conductor sections, the package strip can be cut longitudinally to create more than one package strips, each having one or more longitudinal rows of apertures covered by conductor sections. The package strip can be cut transversely (not parallel to a longitudinal axis) into sections. This can be advantageous in a manual or semiautomatic packaging process. The package strip can be rolled onto a takeup reel, from which it can be fed when needed. The package strip can be fed directly into a subsequent process for assembling the package.

Packages are formed using one or more package strip segments. A peripheral portion of a package strip segment can be secured to itself, to another package strip segment, to another package component, or a combination thereof. For example, a package can be an envelope or pouch, formed from one or several package strip segments. A single segment can be folded to form one edge of the package, and/or peripheral edges are secured or sealed to form package seams. The contents of the fuel unit (e.g., reactant composition, heating elements, thermal insulation, and the like) can be positioned before the envelope or pouch is formed or before securing or sealing the last seam. In another example, a package strip segment can be used to close or seal another package component after the contents have been inserted to form the package. Various processes can be used to secure a package strip component, such as heat healing, adhesive bonding, ultrasonic welding, laser welding and pressure lamination. A package strip segment can be secured with a continuous or a discontinuous bond. A continuous bond can provide a seal to prevent the passage of gas. The fuel unit package can include a hydrogen gas outlet. The outlet can be an opening in the package, such as an aperture or slit in package strip segment or other package component, or a discontinuous bond between the conductor sections and substrate. The outlet can be a valve, particularly if the package is otherwise sealed.

The reactant composition in the fuel unit can be segregated into separate portions, thereby limiting the amount of reactant composition that can be heated by a single heating element. This can be accomplished, for example, by disposing thermal insulation to segregate the reaction composition into portions, by spacing portions of reactant composition apart from each other, or a combination thereof. Each portion of reactant composition can be heated by one or more heating elements, or a single heating element can heat more than one portion.

If the fuel unit package includes another package component besides the package strip segment, the other package component can be one or more containers with one or more open sections or sides that are closed by securing one or more package strip segments there across. The other package component can be made from a high temperature polymer for example. The container can have one or more compartments within which reaction composition is contained. Multiple compartments, whether in a single or multiple containers, can be used to segregate the reaction composition into separate portions of reactant composition. This can be helpful in limiting the reactant composition in which reaction can be initiated by heat from a single heating element. For example, when heat is conducted through a conductor section to heat a portion of reactant composition in a corresponding compartment, or when current is conducted through a pair of conductor sections to an internal heater in a corresponding compartment, reaction of the reactant composition can be limited to the portion of reactant composition contained within that compartment. Poor thermal conductivity of the compartment walls, space between adjacent compartments, additional thermal insulation, or a combination thereof can prevent initiation of reaction of reactant composition in nearby compartments. Thermal insulation can be added inside or outside walls of one or more of the container, the compartment and/or the package strip segment.

In the assembled fuel unit, the conductor sections in the package are disposed to conduct either current from an external energy source or heat from an external heating element through the package. In an embodiment in which the fuel unit contains one or more internal (within the package) heating elements, the package includes at least two electrically conductive components, one that is electrically connected to each of two terminals of a corresponding heating element. At least one of these electrically conductive components is a conductor section in a package strip segment. There can be two conductor sections connected to each internal heating element, or one terminal of each of a plurality of heating elements can be connected to a common conductor section. Because the conductor sections are electrically insulated from each other by portions of the substrate strip between apertures, electrical shorting between conductor sections is prevented. In an embodiment in which the hydrogen generator has one or more external (outside the fuel unit package) heating elements, each conductor section can conduct heat from a separate heating element through the package, or heat from more than one heating element can be conducted through a single conductor section.

The fuel unit reaction composition includes one or more reactants that can react to produce hydrogen gas. In order to economically produce a large volume of hydrogen gas per unit of volume and weight, it is advantageous to use a reactant that can undergo a thermal decomposition reaction that produces hydrogen gas when heated. Such thermal decomposition reactions can produce a larger volume of gas of reactant than, for example, the same amount (per mole, per unit of weight or per unit of volume) of reactants that undergo a hydrolysis reaction. Preferred reactants do not require costly catalysts to undergo the desired hydrogen-generating reactions.

The reactant composition contains at least one hydrogen generating reactant. More than one reactant can be included. Examples of reactants that can evolve hydrogen gas upon thermal decomposition are: lithium imide (Li2NH), lithium amide (LiNH2), an ammonium halide (e.g., $NH_4F$, $NH_4Cl$ or $N_2H_6Cl_2$) plus a chemical hydride (e.g., Lahr, $LiBH_4$, NaBH4, $LiAlH_4$ or $NaAlH_4$), alone ($AlH_3$), ammonia borne ($NH_3BH_3$), ammonia borne plus a chemical hydride (e.g., alone or a boron hydrazine complex such as hydrazine bisborane (N2H4(BH3)2)), ammonium nitrate (NH4NO3) plus diammonium decaborane (B10H10(NH4)2), and other materials, such as graphene and carbon nanotubes with hydrogen inserted therein. Choices of reactants may be limited by other factors such as physical and chemical properties of the reactant, the type and location of heating elements, the temperature range for the desired thermal decomposition reaction, whether the hydrogen-generating reaction is exothermic or endothermic, the composition, form and properties of reaction byproducts, and so on.

The reactant composition can also contain one or more additives. Examples of additives include binders (e.g., acrylates and styrene block copolymers), stabilizing compounds (e.g., solid bases), thermally conductive materials (e.g., metals, graphites and combinations and composites thereof), ignition materials as described below, thermally conductive coatings or layers, thermally insulating coatings or layers, and so on. Preferably catalysts are not included in the reactant mixture.

It may be desirable to include an ignition material in the fuel unit, especially if the reactant is endothermic. An ignition material reacts exothermically when heated and can be used in conjunction with the initiation system to provide heat to initiate the hydrogen generating reaction of the reactant. An ignition material can provide a number of advantages. The temperature to which the ignition material must be heated to react may be lower than the minimum reaction temperature of the reactant, reducing the heat producing requirement for the initiation system. Because the ignition material reacts exothermically, it can reduce the total amount of energy that must be supplied to the heating elements during use of the fuel unit, particularly if the thermal decomposition reaction of the reactant is endothermic. An ignition material can be disposed within or in contact with the reactant composition. For example, the ignition material can be an ingredient of the reactant composition, the ignition material can be a separate layer of the reactant composition from the portion containing the hydrogen generating reaction, or ignition material can be in a separate pellet in thermal communication with the reactant composition. When an ignition material is separate from the hydrogen generating reactant, portions containing ignition material can be alternated with portions containing reactant. For example, each portion containing hydrogen-producing reactant can have an adjacent portion of ignition material; a portion containing ignition material can be disposed adjacent to multiple portions of reactant composition. If desired, ignition material can be proximate a surface of the fuel unit to facilitate initiation by an external heating element. A portion of ignition material can extend away from the point of initiation to facilitate heating reactant composition in remote portions of the fuel unit. In some embodiments, both the portion containing hydrogen generating reactant and the portion containing ignition material contain reactant and ignition materials, but in different proportions. Some types of ignition materials will also generate hydrogen gas when they react, contributing to the total amount of hydrogen the fuel unit can provide. Examples of ignition materials include iron powder or $TiH_2$ plus KClO4, Mn02 plus $LiAlH_4$, Ni plus Al, Zr plus PbCrO4, Fe2O3 plus Al (thermite), and $LiAlH_4$ plus NH4Cl. It will be understood that references herein to initiating a reaction in a hydrogen generating reactant includes initiating a heat generating reaction in an ignition material in embodiments in which the fuel unit includes an ignition material.

The reactant composition is preferably a high density solid, rather than a gas, liquid or gel. The reactant composition can be in any suitable form, such as in powdered or granular form (e.g., contained in one or more compartments), or formed into solid bodies such as pellets, pills, tablets, wafers or cakes, e.g., by compressing, molding extruding depositing, coating roll coating, printing, and so on. The reactant composition can be in contained within one or more receptacles or formed on a substrate. Each fuel unit can have a single quantity of reactant composition, or the reactant composition can be disposed in one or more segregated quantities. Quantities of reactant composition can be sized and shaped to produce a desired amount of hydrogen gas, fit within the fuel unit in a volume efficient manner, facilitate initiation (heating), prevent cross-initiation of adjacent quantities, facilitate release of generated hydrogen, and so on.

Segregated quantities of reactant composition can be separated from one another in various ways, such as by containment in individual compartments and/or being spaced apart by gaps, coatings, thermal insulation and the like. If the reactant composition is contained in one or more compartments, the compartments may be covered with a covering layer to retain the material in the desired compartments. The compartments and the covers can be part of the fuel unit package.

The fuel unit includes a package to contain the reactant composition as well as non-gaseous reaction products. The package will have sufficient strength and chemical and thermal stability to do so during shipping, storage and handling prior to use, during use, and during removal and subsequent handling. The package includes one or more package strip segments as described above. The package can include other components as well, which can be made from a variety of materials, such as metal foil, polymer film, laminates such as metal/plastic laminates, and cast or molded casings. Examples of metal/plastic laminates include metals such as aluminum, nickel, copper and steel and polymers such as polyesters, nylons, polypropylene and polyethylene. High temperature plastics and thermosets can be used to cast or mold casings; examples include polyimides such as KAPTON® (from DuPont) and polyether ether ketone (PEEK) polymers. The package can be closed by any suitable method or methods, such as by folding and/or overlapping, mechanically closing, sealing (e.g., with an adhesive, heat seal, ultrasonics) and so on. It may also be desirable for the package to remain sealed except to release hydrogen as needed. This can require sealing the package, the use of a hydrogen outlet valve and/or the capability of containing at least some internal pressure for example. Sealing the package can protect the contents from exposure to the environment (e.g., from oxygen and moisture), contain small quantities of hydrogen that may be produced before the fuel unit is used and facilitate removal of contaminants from the hydrogen gas before it is released from the fuel unit.

It may be desirable to include thermal insulation near or as part of the package to protect the user when a used fuel unit is removed from the hydrogen generator. The package itself may be or include (e.g., as a layer thereof) a poor thermal conductor, or a layer of thermal insulation can be provided external or internal to the package. Examples of materials that may be suitable as thermal insulation include silica, silicon dioxide, silicon nitrides, silicon carbide, silica aerogel, alumina, aluminum oxide, glass, glass wool, mineral wool, cellular glass, perlite, and polymers such as polyimides and epoxy-amine composites.

It may be desirable to include thermal conductors within the fuel unit to provide good heat transfer to remote portions of the reactant composition (portions that are not close to the package or to the heaters). As described above, additives may be included in the reaction composition for this purpose, or thermally conductive components can be included within the fuel unit. Heating efficiency can also be enhanced by applying heat to a recessed portion of the fuel unit package, such as a hollow core of the fuel unit, rather than to an outer surface (e.g., an outside diameter) of the fuel unit because heating from the inside of the fuel unit will result in less parasitic heat loss than heating from the outside of the fuel unit. A similar effect can be accomplished by locating internal heaters away from the outer surface of the fuel unit.

Fuel units can be used in a hydrogen generator in which the reactant composition in a fuel unit is heated to produce hydrogen gas. The hydrogen gas can be used by a hydrogen consuming apparatus, such as a hydrogen fuel cell battery. The hydrogen generator can be made by providing and assembling: a housing with one or more cavities for removably containing one or more fuel units, one or more heating elements, each configured to heat a portion of the reactant composition in the fuel unit(s) to at least a minimum reaction temperature, an energy source, electric circuitry for supplying electric current to the heating element(s), and one or more fuel units, which are removably inserted into the one or more cavities.

Preferably the hydrogen generator is portable, either alone or as part of a hydrogen consuming apparatus, such as part of a fuel cell system including a fuel cell battery or contained within a portable device that can be powered by a fuel cell system. As used herein, portable means readily moved by an individual person, without requiring the use of lifting or transporting equipment (e.g., a hoist, dolly, lift truck or the like).

In order to provide an economical hydrogen generator, it is desirable to be able to replace reaction byproducts with fresh reactants, rather than replacing the entire hydrogen generator. This allows durable components of the hydrogen generator to be used many times. To maximize this effect, it is desirable to incorporate as many reusable components as practical into the reusable portion of the hydrogen generator (referred to below as the holder), the rest of the fuel cell system and/or the device associated with the fuel cell system, and to limit the number of components in the replaceable portion of the hydrogen generator (referred to below as the fuel unit) to the greatest extent practical. This is particularly true for such items that occupy a relatively large volume and/or are relatively expensive. Ideally, fuel units would contain only the hydrogen generating reactants and minimal packaging. However, for practical reasons it may also be desirable to include other ingredients and components in the fuel units.

The hydrogen generator can include a holder that is configured to receive one or more fuel units. It can contain at least some of the other components of the hydrogen generator. In some circumstances, it may be desirable to locate at least portions of other components outside the holder, such as elsewhere within the fuel cell system and/or device. The holder can include a housing of its own, particularly if the holder is intended to be removed from or used while outside the rest of the fuel cell system or device. A separate holder housing may not be desired if the hydrogen generator is contained within the fuel cell system and/or device. For example, a portion of the fuel cell system or device can serve as all or part of a holder housing. The holder housing has sufficient mechanical strength and resistance to the environment to which the hydrogen generator is expected to be exposed, particularly to high temperatures and reactants and byproducts associated with the hydrogen generating reactions. Metals such as aluminum, steel and stainless steel, ceramics, and high temperature resistant polymers such as polyphenylene sulfide, acrylonitrile butadiene styrene, polyetheretherketone, polyetherimide, polyoxybenzylmethylenglycol anhydride (Bakelite®), epoxies, phenolics, diallyl phthalate and melamine may be suitable for the housing. In some embodiments the holder may be made from a material that is a poor thermal conductor (e.g., less than 10 watts/meter·Kelvin), and preferably less than 1 watt/meter·Kelvin) to protect the rest of the fuel cell system, the device and/or the user from heat produced within the hydrogen generator. If desired, thermal insulation can be added to the hydrogen generator, within the housing, around the housing or elsewhere in the fuel cell system or the device. A vacuum, such as in a hollow space in a wall(s) of the holder, can provide thermal insulation. Thermal insulation can protect components of the hydrogen generator, other parts of the fuel cell system, the device with which the fuel cell system is being used, and/or the user.

The hydrogen generator includes one or more cavities into which fuel units can be removably inserted. The hydrogen generator can include features for aligning the packaged fuel unit in a particular orientation, providing thermal and/or electrical contact with the fuel unit, and/or providing a hydrogen gas flow path between the holder and the fuel unit. For example, walls defining the cavity can include one or more projections that cooperate with features of the fuel unit to permit insertion of a fuel unit into the cavity in only the desired orientation, projections can provide electrical and/or thermal contact with the fuel unit, or one or more projections can extend into a recessed area of the fuel unit to provide heating from the inside of the fuel unit outward. The hydrogen generator can be closable to retain the fuel unit within the cavity, and it may be sealable to exclude gases from the outside environment and to contain pressurized hydrogen gas. If internal pressure can build up during operation of the hydrogen generator, it may be desirable to include a pressure relief vent to release gas before the pressure becomes excessive (i.e., to prevent undesired opening or bursting of the housing).

Hydrogen gas produced in the fuel unit exits the fuel unit and then exits the hydrogen generator through a hydrogen flow path to an outlet that interfaces with the rest of the fuel cell system. The hydrogen generator can include various fittings, valves and electrical connections for providing hydrogen to and interfacing with the fuel cell battery and/or an electrical device being provided with power by the fuel cell system. It may be desirable to provide one or more filters or purification units (referred to as filters below) in the hydrogen flow path to remove solid or gaseous byproducts (such as fuel cell poisons) and/or unreacted reactant from the hydrogen. Filters can be located within the fuel units, within the holder and/or at the interface between the hydrogen generator and the rest of the fuel cell system. Filters within the fuel units are replaced when the fuel units are replaced. It may be desirable to provide access for periodically replacing filters located outside the fuel units. Examples of materials that may be suitable for filters include silica, silicon dioxide, silicon nitrides, silicon carbide, silica aerogel, alumina, aluminum oxide, glass, glass wool, mineral wool, cellular glass, microfiberglass, perlite and polymers such as polytetrafluoroethylenes, polyimides and epoxyamine composites, as well as suitable gas purification units (such as ion exchange resins). It may be possible to position filters so they also provide thermal insulation.

The hydrogen generator includes one or more heating elements for converting electric energy to thermal energy that can provide heat for a hydrogen-generating thermal decomposition reaction in the fuel unit. Examples of suitable energy sources include one or a combination of a primary battery, a secondary battery, a fuel cell battery, a capacitor and a public utility. The energy source is preferable outside the fuel unit, such as in the holder, elsewhere in the fuel cell system, in the device, or external to the device. Circuitry in the hydrogen generator and/or the fuel unit can carry the electric energy to the heating element(s). External heating elements can be located outside the fuel unit (e.g., in the holder), where they can be reused, and internal heating elements can be located within the fuel unit, particularly when the heating elements occupy only a small volume and are inexpensive. The heating element can be a resistive heater. Any suitable resistive heater can be used, such as a resistive heater including metals or alloys such nickel-chromium, iron-chromium-aluminum and copper-nickel. An external heater heating element will be in thermal contact with a thermally conductive conductor sections in the fuel unit package such that heat produced by the heating element is conducted through the package to the contents of the fuel unit. To provide good thermal contact, the fuel unit package can fit snugly against the heater or an intermediate thermal conductor. The heater or intermediate thermal conductor can be biased against the conductor section. This can be accomplished by configuring the heating element as a biasing member and/or by placing an intermediate biasing member that is a good thermal conductor in thermal contact between the heating element and the fuel unit package conductor section. The use of a biasing member can provide good thermal contact between the heating element and the fuel unit without impeding insertion or removal of the fuel unit into and from the cavity and can compensate for expansion or contraction of the fuel unit during use. If the heating element is internal, it is in electrical communication with the energy source, such as through electrical terminals in the holder that make electrical contact with corresponding conductor sections in the fuel unit package. The terminals can be biased against the package in a manner similar to that described above for external heaters and intermediate thermal conductors.

As described in further detail below, multiple heating elements can be used to provide the capability of selectively heating limited quantities of the total amount of reactant in one or more fuel units. This can be helpful in generating hydrogen gas on an as needed basis and minimizing response times during intermittent use, without creating excessive pressure within the hydrogen generator. For example, individual heating elements can be associated with segregated quantities of reactant within a fuel unit, and operation of selected heating elements can be controlled to initiate reaction within only the desired quantities of reactant. This can require alignment of the conductor sections in the fuel unit package with individual heating elements or electrical contact terminals in the hydrogen generator outside the fuel unit. As an alternative, a heating element can be moved within the cavity to align with selected conductor sections of the fuel unit package. This can provide controlled generation of hydrogen gas with fewer heating elements, but adding volume and cost for of the mechanism necessary to move the heating element.

In order to provide hydrogen gas on an as-needed basis without developing a high internal pressure within the hydrogen generator, it may be advantageous for the hydrogen generator to include multiple fuel units, each of which that can be used selectively, and/or for the fuel unit(s) to contain multiple segregated quantities of reactant composition in which the hydrogen-generating reaction can be individually initiated on a selective basis. This can be accomplished by using a control system in conjunction with multiple heating elements and/or a movable heating element that can be located within or aligned with individual segregated quantities of reactant composition in the fuel unit(s).

The control system can be used to control the supply of energy from a source to the heating elements system. The control system can determine the need for hydrogen and/or the required hydrogen flow rate by monitoring the pressure within the fuel cell system, one or more electrical characteristics of the fuel cell stack, or one or more electrical characteristics of the electronic device, for example. The controller may communicate with the device or the fuel cell battery to determine when more hydrogen is needed. The control system can be completely or partially disposed in the hydrogen generator, the fuel cell battery, the electronic device being powered by the fuel cell battery, or any combination thereof The control system can include a microprocessor or microcontroller; digital, analog and/or hybrid circuitry; solid state and/or electromechanical switching devices; capacitors, sensing instrumentation, timers and so on. The same or a different control system can also be used for other purposes, such as identifying hydrogen generators and fuel units that are appropriate or approved for use, preventing use of inappropriate or unapproved hydrogen generators and fuel units, controlling charging of batteries in the fuel cell system and the device by the fuel cell battery, calculating and providing information on the remaining capacity of the fuel unit(s), recording historical information regarding the use of fuel units, the hydrogen generator, the fuel cell system and the device, preventing operation of the hydrogen generator under unsafe conditions, and other purposes.

Figure 2:
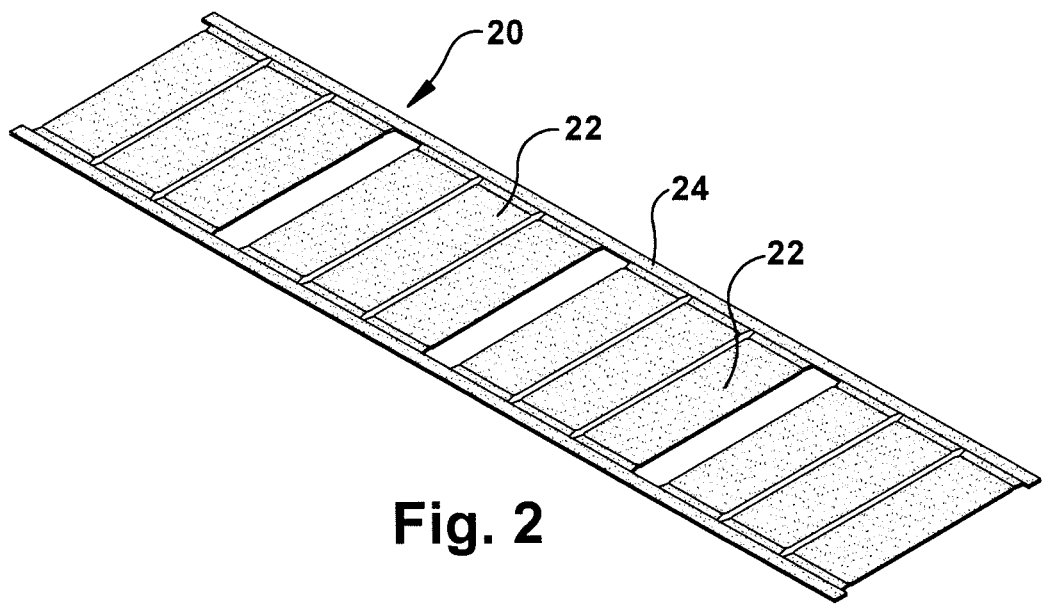
FIG. 2 is a perspective view of a portion of a conductor strip after forming therein conductor sections attached to a conductor strip web.

An embodiment of a portion of a substrate strip 10 after apertures 12 have been formed therein is shown in FIG. 1, and an embodiment of a portion of a conductor strip after conductor sections 22 and a conductor web 24 have been formed therein is shown in FIG. 2. Various sizes and shapes can be used, and the strips 10 and 20 can have one or more than one rows of apertures 12 and conductor sections 22 across the width of the strips, as described above.

Figure 3:
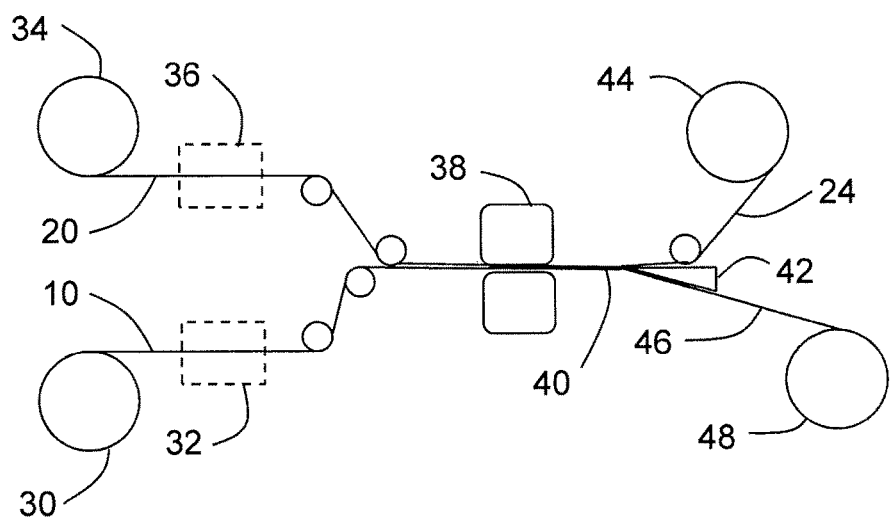
FIG. 3 is a schematic drawing of an embodiment of a process for making a package strip.

An embodiment of a process for making a package strip is shown schematically in FIG. 3. A substrate strip 10 is dispensed from a substrate strip dispenser 30 to an aperture former 32, where an array of apertures is formed in the substrate strip 10. For example, a substrate strip 10 in roll form can be unwound and fed from a reel, or small lengths of a substrate strip 10 can be feed from a magazine. A conductor strip 20 is dispensed from a conductor strip dispenser 34, such as a reel or a magazine, to a conductor section and web former 36, where an array of conductor sections connected to a web of the conductor strip material. Material removed from the substrate strip 10 and the conductor strip 20 can be disposed of or recycled for example. The substrate strip 10 and conductor strip 20 are then aligned with each other, and the conductor sections 22 are secured to the substrate strip 10 by a bonder to cover the apertures 12, thereby forming a bonded strip 40. The conductor web 24 is then separated from the bonded strip 40 by a web separator 42 and collected in a web accumulator 44 (e.g., for disposal or recycling). The remaining package strip 46 is then collected in a package strip accumulator 48 (e.g., on a reel or in a magazine). Between separation of the conductor web and collection of the package strip 46 in the package strip accumulator 48, additional processing can be done. For example, the package strip 46 can be pressed or rolled to flatten the conductor sections 22 so there are no protruding edges, or the package strip 46 can be trimmed or cut into narrower strips or shorter segments.

Figure 4:
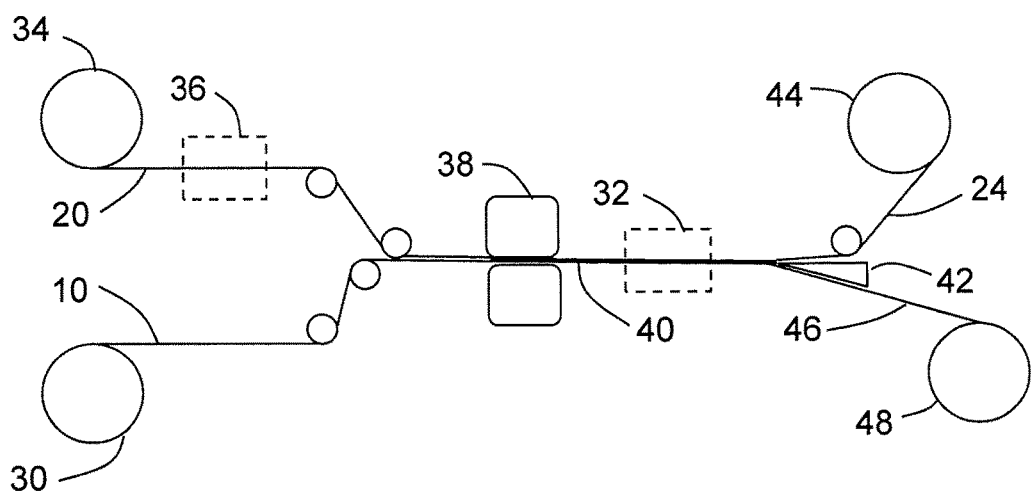
FIG. 4 is a schematic drawing of an embodiment of a process for making a package strip.

In the embodiment shown in FIG. 3, apertures 12 are formed in the substrate strip 10 before it is joined with the conductor strip 20; but, as described above, the apertures 12 can be formed after bonding the conductor sections 22 to the substrate strip 20. Such an embodiment is shown in FIG. 4, where the aperture former 32 is after the bonder 38. FIG. 4 is otherwise as described above with reference to FIG. 3.

Figure 5:
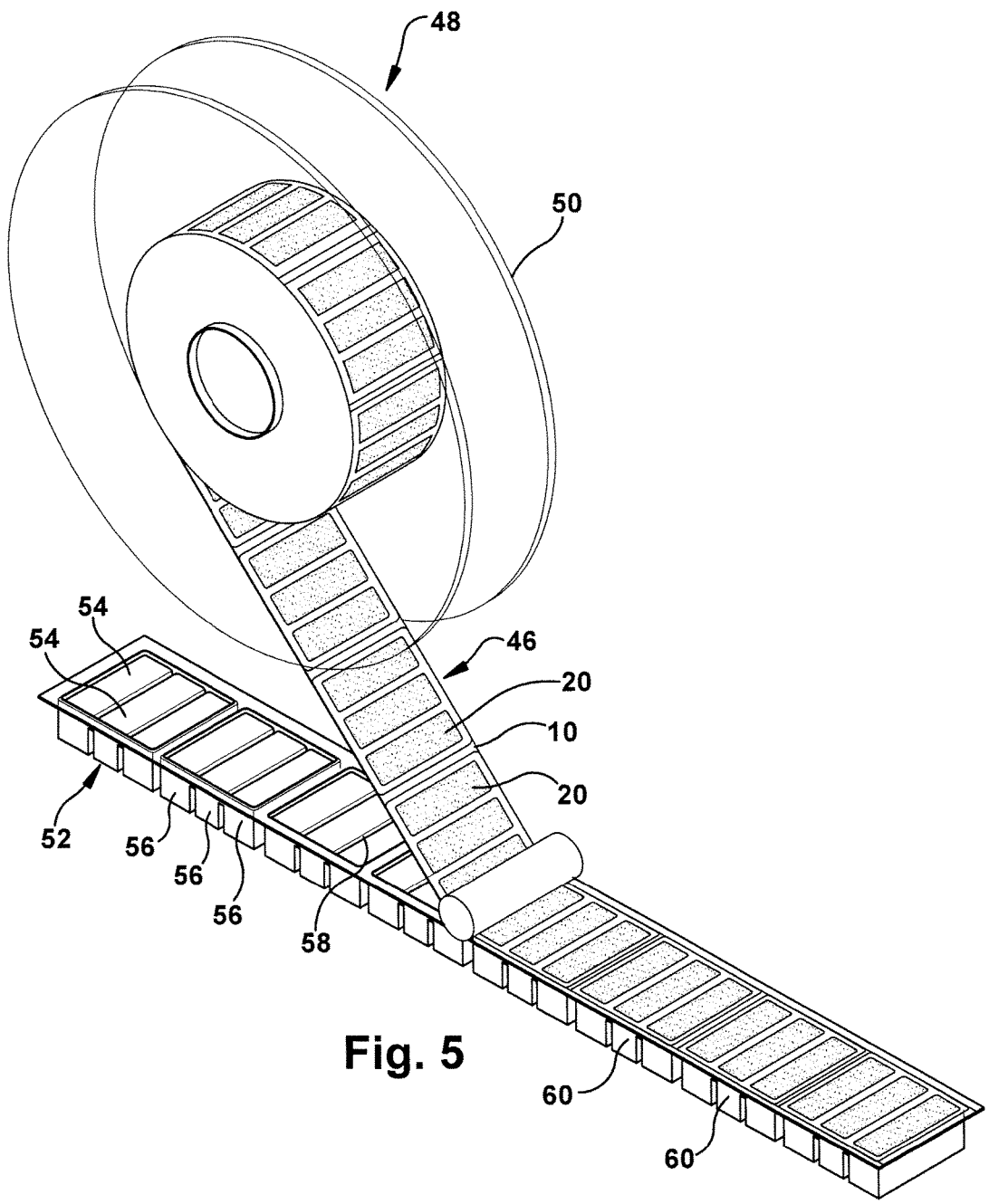
FIG. 5 is a perspective view of a package strip being secured to fuel unit containers.

FIG. 5 shows an embodiment of a method of making packages containing a hydrogen producting reactant composition using a package strip, such as package strip 46 produced according to the embodiments shown in FIGS. 3 and 4. The package strip 46 is contained in package strip accumulator 48. As shown in FIG. 5, the package strip accumulator 48 includes a reel 50 on which the package strip 46 is wound, though the package strip accumulator 48 could be another type of accumulator as described above. The package strip 46 is secured over the open portions of containers 52, each containing at least one quantity 54 of reactant composition. Each container 52 is shown including three compartments 56, each containing a quantity 54 of reactant composition, though the number of compartments 56 and quantities 54 of reactant composition per container 52 can be varied. The package strip 46 can be secured with an adhesive applied to one or both of the package strip 46 and the containers 52, by heat sealing the package strip substrate 10 to the containers, or by any other suitable method, as described above, to form packaged fuel units 60. As shown in FIG. 5, the package strip 46 is aligned with the containers 52 such that a conductor section is positioned over and in contact with each quantity 54 of reactant composition. The quantities 54 of reactant composition can each be in individual compartments 56, either formed in the containers 52 or created by thermal insulation members 58 or spaces between the quantities 54 of reactant composition in the containers 52. The containers 52 can be interconnected or separated from one another prior to securing the package strip 46. After securing to the containers, the package strip 46 can interconnect the containers 52. Subsequently, some or all of the interconnected containers 52 can be separated by cutting portions of the containers 52 and/or the package strip 46. It may be convenient to leave some packaged fuel units 60 interconnected to facilitate further processing. The spacing of the conductor sections 20 (i.e., the amount of substrate 10 between adjacent conductor sections 20) can be varied, depending upon whether or not the adjacent fuel units 60 are to remain interconnected. Optionally, thermal insulation can be added to exterior portions of the packaged fuel units 60.

Figure 6:
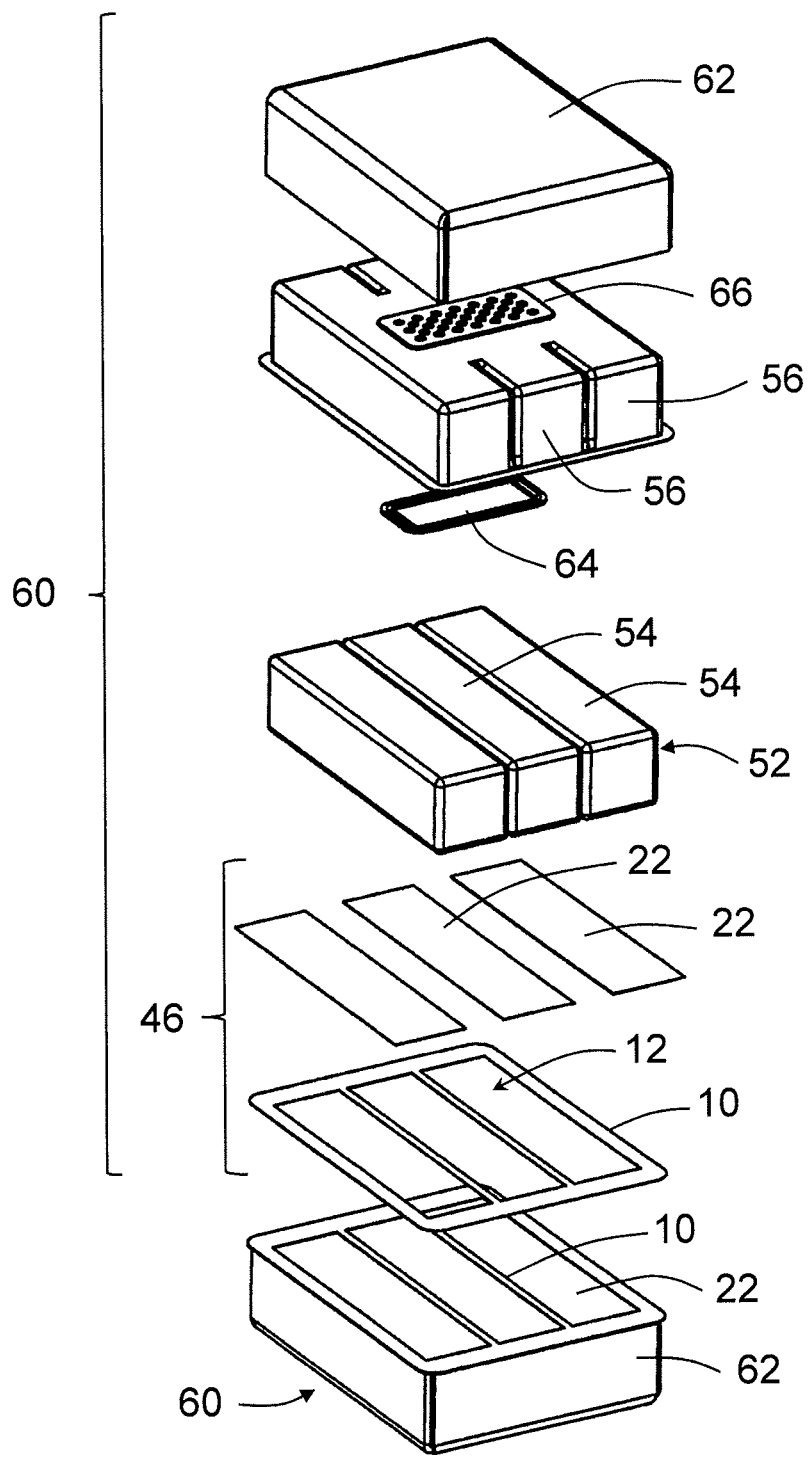
FIG. 6 is a partially exploded perspective view of two fuel unit packages.

FIG. 6 shows two packaged fuel units 60, one of which is shown exploded so internal components are visible. The fuel units 60 are positioned with their packaging strips 46 facing each other. Each of the fuel units 60 are shown in FIG. 6 with external thermal insulation 62 surrounding all sides except the sides covered by the package strips 46. In some embodiments the fuel units 60 can be connected to each other, such as along one edge. They can be interconnected by one or any combination of their containers 52, package strips 46, external thermal insulation 62, or some other component (not shown). If the fuel units 60 are interconnected, they can be spaced apart, and if the interconnection is at least somewhat rigid, spacing can be maintained between the fuel units 60, such as to accommodate a heater assembly between the fuel units 60. The fuel unit 60 can include a hydrogen gas outlet 66 and a filter 64 between the quantities of reactant composition 54 and the outlet 66 (e.g., by attaching a filter membrane to the outlet 66 or the container 52.

An embodiment of a hydrogen generator is shown in FIG. 7. The hydrogen generator 70 includes a housing 72, with a cavity 74 into which packaged fuel units 60 can be inserted. The hydrogen generator 70 includes a door 76 for closing and sealing the housing 72 with the fuel units 60 inside. Two rectangular fuel units 60, each containing three segregated quantities 54 of reactant composition are shown, but fewer or more fuel units with the same or different shapes and the same or a different number of quantities of reactant composition can be used. The hydrogen generator 70 further includes at least one heater assembly 78 with one or more heating elements 80 each. As shown in FIG. 7, the heater assemblies 78 can be attached to the door 76, or they can be attached to the housing 72. The heater assemblies 78 can be on an inner surface of the door 76 or housing 72, such that the heating elements 80 will make contact with corresponding conductor sections 22 when the fuel units 60 are inserted in the cavity 74. Alternatively, the heater assemblies 78 can be on a support member 82 extending from the door 76 (as shown in FIG. 7) or from the housing 70, such that heating elements 80 will make contact with corresponding conductor sections 22 when the fuel unit(s) are inserted in the cavity 74. By centrally locating the heater assembly 78, the fuel units 60 are substantially heated from the inside out.

Another embodiment of a hydrogen generator is shown in FIG. 8. Hydrogen generator 84 includes a housing 72, with a cavity 74 into which packaged fuel units 86 can be inserted. The hydrogen generator 70 includes a door 76 for closing and sealing the housing 72 with the fuel units 86 inside. Four triangular fuel units 86 with one quantity of reactant composition each are shown, but as with hydrogen generator 70 in FIG. 7, different shapes and numbers of fuel units with different numbers of quantities of reactant composition can be used. The hydrogen generator 84 includes at least one heater assembly 88 with one or more heating elements 90. The heater assembly 88 can be attached to the door 76 or, as shown in FIG. 8, to the housing 72. Heating assemblies 88 can be on an inner surface of the housing 72 (as shown) or door 76, such that the heating elements 90 will make contact with corresponding conductor sections 22 when the fuel unit 86 are inserted in the cavity 74. Alternatively, the heater assemblies 88 can be on a support member 92 extending from the door 76 (as shown) or from the housing 72, such that heating elements 80 will make contact with corresponding conductor sections 22 when the fuel units 86 are inserted in the cavity 74.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

What is claimed is:

1. A method of making a package for a hydrogen generator fuel unit, the method comprising the steps:
   (a) providing a substrate strip made of an electrically nonconductive material with a thermal conductivity less than 10 watts/meter•Kelvin;
   (b) forming an array of apertures in the substrate strip;
   (c) providing a conductor strip made of an electrically conductive material with a thermal conductivity greater than 10 watts/meter•Kelvin;
   (d) forming an array of conductor sections in the conductor strip;
   (e) aligning individual conductor sections in the conductor strip with apertures in the substrate strip;
   (f) bonding a peripheral portion of each of the individual conductor sections to a portion of the substrate strip surrounding one or more of the apertures to form a bonded strip; and
   (g) removing nonbonded portions of the conductor strip from around the bonded conductor sections of the bonded strip to form a package strip;
   (h) providing an array of compartments, each compartment including a reactant composition; and
   (i) securing the package strip to the array of compartments to form the package for the hydrogen generator unit.

2. The method according to claim 1, wherein the substrate strip is made from at least one high temperature polymer, the high temperature polymer having a heat distortion temperature, per ASTM D648 at 18.56 kg/cm², of at least 250° C.

3. The method according to claim 2, wherein the at least one high temperature polymer comprises two or more high temperature polymers.

4. The method according to 2, wherein the at least one high temperature polymer comprises polymer selected from polyetheretherketone, polyimides, phenolics, and derivatives thereof.

5. The method according to claim 1, wherein the conductor strip is made from a material selected from metals, metal alloys and non-metallic materials.

6. The method according to claim 1, wherein at least one of the substrate strip, the conductor strip and the package strip is provided in a roll.

7. The method according to claim 1, wherein the package strip is cut into segments for a subsequent batch process.

8. The method according to claim 1, wherein the array of apertures comprises apertures arranged in at least one longitudinal row extending parallel to a longitudinal axis of the substrate strip.

9. The method according to claim 1, wherein the substrate strip and the conductor strip have registration features for aligning the individual conductor sections in the conductor strip with the corresponding apertures in the substrate strip.

10. The method according to claim 1, wherein the step of forming an array of conductor sections in the conductor strip comprises creating weak areas around the conductor sections to facilitate removing nonbonded portions of the conductor strip from around the bonded conductor sections of the bonded strip.

11. The method according to claim 10, wherein the weak areas comprises one or more of narrow bands connecting the conductor sections to surrounding conductor strip, and coined areas between the conductor sections and surrounding conductor strip.

12. The method according to claim 1, wherein the step of forming an array of conductor sections in the conductor strip comprises removing some portions of the conductor strip around the conductor sections and leaving a non-bonded web of conductor strip material connected to the conductor sections.

13. The method according to claim 12, wherein the non-bonded web of conductor strip material is removed by breaking the web near the conductor sections to disconnect the web from the conductor sections and separating the disconnected web from the remainder of the bonded strip.

14. The method according to claim 1, wherein the step of removing nonbonded portions of the conductor strip from around the bonded conductor sections of the bonded strip is performed while a bonding tool is in contact with the conductor strip.

15. The method according to any one of the preceding claims, wherein more than one aperture is covered by a single conductive section.

16. The method according to claim 15, wherein after bonding a peripheral portion of each of the individual conductor sections to a portion of the substrate strip surrounding each of the corresponding apertures, a portion of the conductor material between adjacent apertures covered by the single conductive section is removed so each of the apertures that was covered by a single conductive section is covered by a separate conductive section.

17. The method according to claim 1, wherein the substrate strip and the conductor strip are aligned with their longitudinal axes parallel to each other.

18. The method according to any one of claim 1, wherein the substrate strip and the conductor strip are aligned with their longitudinal axes perpendicular to each other during bonding.

* * * * *